(12) United States Patent
Chene

(10) Patent No.: US 10,042,065 B2
(45) Date of Patent: Aug. 7, 2018

(54) METHOD AND DEVICE FOR STEERING A SEISMIC VESSEL

(71) Applicant: SERCEL, Carquefou (FR)

(72) Inventor: Fabien Chene, Guerande (FR)

(73) Assignee: SERCEL, Carquefou (FR)

( * ) Notice: Subject to any disclaimer, the term of this patent is extended or adjusted under 35 U.S.C. 154(b) by 541 days.

(21) Appl. No.: 14/586,163

(22) Filed: Dec. 30, 2014

(65) Prior Publication Data

US 2015/0185350 A1 Jul. 2, 2015

(30) Foreign Application Priority Data

Dec. 31, 2013 (EP) .................................... 13306903

(51) Int. Cl.
*G01V 1/38* (2006.01)
(52) U.S. Cl.
CPC .......... *G01V 1/3817* (2013.01); *G01V 1/3808* (2013.01)
(58) Field of Classification Search
CPC ........................... G01V 1/3808; G01V 1/3817
See application file for complete search history.

(56) References Cited

U.S. PATENT DOCUMENTS

| 2004/0230379 A1 | 11/2004 | Houck |
| 2007/0165486 A1 | 7/2007 | Moldoveanu et al. |
| 2013/0051175 A1* | 2/2013 | Boberg ................ G01V 1/3835 367/16 |
| 2013/0155805 A1 | 6/2013 | Tonchia |
| 2016/0061980 A1* | 3/2016 | Tonchia ............... G01V 1/3808 701/21 |

OTHER PUBLICATIONS

European Search Report and Written Opinion dated May 13, 2014 for corresponding European Patent Application No. 13 30 6903, filed Dec. 31, 2013.

* cited by examiner

*Primary Examiner* — Krystine E Breier

(74) *Attorney, Agent, or Firm* — Ipsilon USA, LLP

(57) ABSTRACT

It is proposed a method for steering a seismic vessel associated with a sail line and a preplot line. The seismic vessel tows at least one acoustic linear antenna including receivers, the receivers receiving signals generated by at least one source and reflected by subsurface's layers at reflexion points. The method includes: computing, according to a regression method, a shifted preplot line which has a shape substantially identical to the shape of the preplot line and which is the best fit line associated with at least some of the reflexion points; computing a distance D between the preplot line and the shifted preplot line; and providing steering information comprising or based on the distance D to a navigation system or to an operator of a navigation system, to alter the course of the seismic vessel.

11 Claims, 6 Drawing Sheets

METHOD AND DEVICE FOR STEERING A SEISMIC VESSEL

1. FIELD OF THE DISCLOSURE

The field of the disclosure is that of geophysical data acquisition.

More precisely, the disclosure relates to marine seismic acquisition involving one or several vessels to achieve an imaging of the seabed earth crust.

In particular, the disclosure relates to a technique for steering a seismic vessel associated with a sail line and a preplot line (also referred to as "track line") which is often the same than the sail line (the terms "sail line" and "preplot line" are defined below). The seismic vessel tows at least one acoustic linear antenna (hereinafter named streamer) comprising receivers. The receivers receive signals generated by at least one source and reflected by the subsurface's layers at reflexion points.

In other words, the disclosure concerns a steering technique applicable to a seismic vessel, and is used to perform a reasonably good coverage over a survey area. The disclosure is to be used typically in 3D surveys with the motivation of doing a 4D survey later on the same area.

The present disclosure can be applied notably to the oil exploration industry, but may also be applied to any field using a geophysical data acquisition network in a marine environment.

2. TECHNOLOGICAL BACKGROUND

The main purpose of an exploration (e.g. offshore oil exploration) over a survey is to cover its underlying area.

As shown in FIG. 1, to ensure this goal is achieved, the area is divided into small areas called bins 2. These bins are virtually located at the bottom of the sea, and the purpose is to hit them through various kinds of reflected waves 8. These waves are captured by receivers (hydrophones) 3 that are part of different source-receiver offset classes, also referred to as "offset classes" (see vertical lines referenced 4, symbolizing the separators between offset classes). A source-receiver offset is an offset distance between source and receiver. The offset classes can possibly be one of the following: "near offsets", "near-mid offsets", "mid-far offsets", "mid offsets", "far offsets", . . . , depending on the receiver location along the streamer (linear antennas) 7 towed the seismic vessel 6. Each bin 2 shall be hit enough through these offset classes, according to the client specification, so that the coverage can be considered correct. In fact, the wave 8 starts from the source 5, and ends at a receiver 3 after bouncing on a reflexion point 1, at the bottom of the sea (more precisely, the wave is reflected by the subsurface's layers, at a reflexion point 1). Thus, a bin 2 is considered hit when the reflexion point 1 falls into it.

Operationally, as shown in FIG. 2, the survey is discretized into preplot lines 24, 25, 26, etc. A preplot line is an arbitrary geometric curve, and can be therefore a straight line, a broken line, a circle, an ellipsoid, or something else that can be mathematically expressed through an equation of the type $f(x,y)=0$. Those preplot lines are positioned on the survey area in such a way that following all of them with a null steering offset (see definition below) and the streamers 7 perfectly aligned behind the vessel 6, would result in a perfect global coverage (a part of which corresponds to each of the preplot lines). In FIG. 2, the coverage corresponding to each of the preplot lines referenced 24, 25 and 26 are referenced 21, 22 and 23 respectively. Being able to steer with a null steering offset and getting streamers perfectly aligned behind the vessel is in practice impossible, mainly because of currents. In practice, preplot lines are contiguously shot so that one can adjust the vessel position to juxtapose the coverage of a given preplot line with the coverage of the adjacent preplot line(s).

In operation, the line along which the vessel actually sails is called "sail line". The sail line is generally the preplot line, but can be different in some rare cases, e.g. if the vessel must avoid an obstacle located on the preplot line (oil platform, FPSO unit ("floating production, storage and offloading unit"), etc).

In practice, the navigation system (also referred to as INS, for "Integrated Navigation System"), which is onboard the vessel, typically receives two control settings:
- the steering offset (also referred to as "desired track offset" or DTO), which is the desired offset between the sail line and the vessel; and
- a distance DC, which is the current distance from the sail line to the vessel position.

Within the navigation system, these control settings are usually used by an autopilot system (e.g. Robtrack) which determines how to alter the seismic vessel course so that the vessel reaches a new position in which the steering offset (DTO) is respected.

In a first known solution, this operation of juxtaposition is manually done aboard, by using the information given by a binning software. For the navigator (human operator), the usual process is to watch the binning software screen, spot holes (e.g. 27) in the coverage by scanning the colours, possibly anticipatively, and to adjust the vessel course accordingly. In practice, the steering offset (DTO) is constantly adjusted (visually) by the human operator.

A main drawback of the first known solution is that steering the vessel to juxtapose the coverage of a preplot line with the coverage of the adjacent preplot line(s) implies that navigators (human operators) must constantly adjust their steering offset by taking the information of the binning software, from the binning offset classes considered. Doing so manually is suboptimal and is very difficult to achieve even for an experienced user.

Another drawback of the first known solution is an excessive steering caused by the motivation of juxtaposing the coverage. Overdoing it often results in a too dynamic line, difficult to mimic in case of a future 4D survey based on the current one.

A second known solution (more recent practice) is to maintain a null steering offset with regards to the preplot line.

A main drawback of the second known solution is that setting a null steering offset indeed facilitates the 4D survey to come, but will result in a poor global coverage.

For information, a 4D acquisition well known in the field of seismic is to repeat later a 2D or 3D acquisition, in order to analyze the changes between two periods, typically to monitor a reservoir.

3. SUMMARY

A particular embodiment of the disclosure proposes a method for steering a seismic vessel associated with a sail line and a preplot line, said seismic vessel towing at least one acoustic linear antenna comprising receivers, said receivers receiving signals generated by at least one source and reflected by subsurface's layers at reflexion points. The method comprises:

a) computing a shifted preplot line which has a shape substantially identical to the shape of the preplot line and which is, according to a regression method, the best fit line associated with at least some of the reflexion points;
b) computing a distance D between the preplot line and the shifted preplot line; and
c) providing steering information comprising or based on the distance D to a navigation system or to an operator of a navigation system, to alter the course of the seismic vessel.

This particular embodiment relies on a wholly novel and inventive approach. Indeed, the idea (general principle) is to control the vessel indirectly by spreading the reflexion points around the preplot line.

To achieve this, a shifted preplot line is computed (nearest line of n reflexion points according to a predetermined criterion, e.g. least squares), then a distance D between this shifted preplot line and the preplot line is computed, and this distance D is used to alter the seismic vessel course. Thus, after the vessel has actually made a shift of D, it will be in the correct position and the reflexion points will be spread around the preplot line.

Thus, if the survey is well designed, if the streamer separations are maintained and the reflexion points are correctly balanced with regards to the preplot line, then repeating the proposed solution over all the preplot lines shall result in a reasonably good coverage.

Doing so also reduces the risk of high dynamic lines because the steering will not be too aggressive. Hence a 4D survey based on the same preplot lines shall be easy to perform. In other words, the proposed solution provides a way of steering the vessel to obtain a good coverage, especially if an objective is to facilitate future 4D or if there is no binning information available from a contiguous line.

The proposed solution is very simple and can be performed automatically, without requiring any intervention of a human operator (navigator).

According to a particular feature, the regression method is a linear regression method, minimizing a function having as argument a set of distances from a set of n reflexion points to the shifted preplot line.

Thus, the proposed solution is easy to implement.

According to a particular feature, the linear regression method is the least squares regression method.

Thus, the proposed solution is easy to implement.

According to a first particular implementation, in step a):
the preplot line's equation is: y=ax+b;
the shifted preplot line's equation is: y=ax+b';
the distance $e_i$ from a given reflexion points $P_i$ ($x_i$, $y_i$) to the shifted preplot line is defined as: $e_i=y_i-ax_i-b'$; and
b' is obtained as follows:

$$b' = \frac{1}{n}\sum_{i=1}^{n}(y_i - ax_i),$$

with n the number of reflexion points;
and in step b), the distance D is computed as follows:

$$D = \frac{b-b'}{\sqrt{a^2+1}}.$$

According to a second particular implementation, in step a):
the preplot line's equation is: x=b;
the shifted preplot line's equation is: x=b';
the distance $e_i$ from a given reflexion points $P_i$ ($x_i$, $y_i$) to the shifted preplot line is defined as: $e_i=x_i-b'$; and
b' is obtained as follows:

$$b' = \frac{1}{n}\sum_{i=1}^{n}x_i,$$

with n the number of reflexion points;
and in step b), the distance D is computed as follows:
D=b−b'.

According to a particular feature, the distance D is a directed distance from the shifted preplot line to the preplot line, having a negative value when the shifted preplot line is on the right of the preplot line when considering the direction of the preplot line.

According to a particular feature, the steering information comprise:
a directed distance DC from the sail line to a current position of the seismic vessel, having a positive value when the seismic vessel is on the right of the sail line, when considering the direction of the sail line; and
a desired track offset DTO, which is a directed distance from the sail line to a desired position of the seismic vessel, having a positive value when the seismic vessel is on the right of the sail line when considering the direction of the sail line, DTO being defined as follows: DTO=DC+D.

Thus the proposed solution can be used with the navigation system which typically receives two control settings: the steering offset (DTO) and the distance DC.

According to a particular feature, the receivers are divided in a plurality of offset classes. Said steps a) and b) are carried out for at least two offset classes of said plurality, a distance D being computed for each offset class. The method comprises a step b') of computing a final distance $D_f$ on the basis of the distances D computed for said at least two offset classes. In said step c) the steering information comprise or are based on the final distance $D_f$.

Thus several (and possibly all) the offset classes are taken into account.

According to a particular feature, the final distance $D_f$ is a weighted average of the distances D computed for the at least two offset classes.

Thus, the proposed solution is easy to implement.

In another embodiment, the disclosure pertains to a computer program product comprising program code instructions for implementing the above-mentioned method (in any of its different embodiments) when said program is executed on a computer or a processor.

In another embodiment, the disclosure pertains to a non-transitory computer-readable carrier medium, storing a program which, when executed by a computer or a processor causes the computer or the processor to carry out the above-mentioned method (in any of its different embodiments).

In another embodiment, the disclosure pertains to a device for steering a seismic vessel associated with a sail line and a preplot line, said seismic vessel towing at least one acoustic linear antenna comprising receivers, said receivers receiving signals generated by at least one source and reflected by subsurface's layers at reflexion points. Said device comprises:

means for computing a shifted preplot line which has a shape substantially identical to the shape of the preplot line and which is, according to a regression method, the best fit line associated with at least some of the reflexion points;

means for computing a distance D between the preplot line and the shifted preplot line; and means for providing steering information comprising or based on the distance D to a navigation system or to an operator of a navigation system, to alter the course of the seismic vessel.

Advantageously, the device comprises means for implementing the steps it performs in the method for steering as described above, in any of its various embodiments.

4. LIST OF FIGURES

Other features and advantages of embodiments of the disclosure shall appear from the following description, given by way of an indicative and non-exhaustive examples and from the appended drawings, of which:

FIG. 1, already discussed in relation to the prior art, illustrates the notions of bin, reflexion point and offset classes;

FIG. 2, already discussed in relation to the prior art, illustrates the notions of preplot line and corresponding coverage;

5. DETAILED DESCRIPTION

In all of the figures of the present document, identical elements and steps are designated by the same numerical reference sign.

Figure 5:
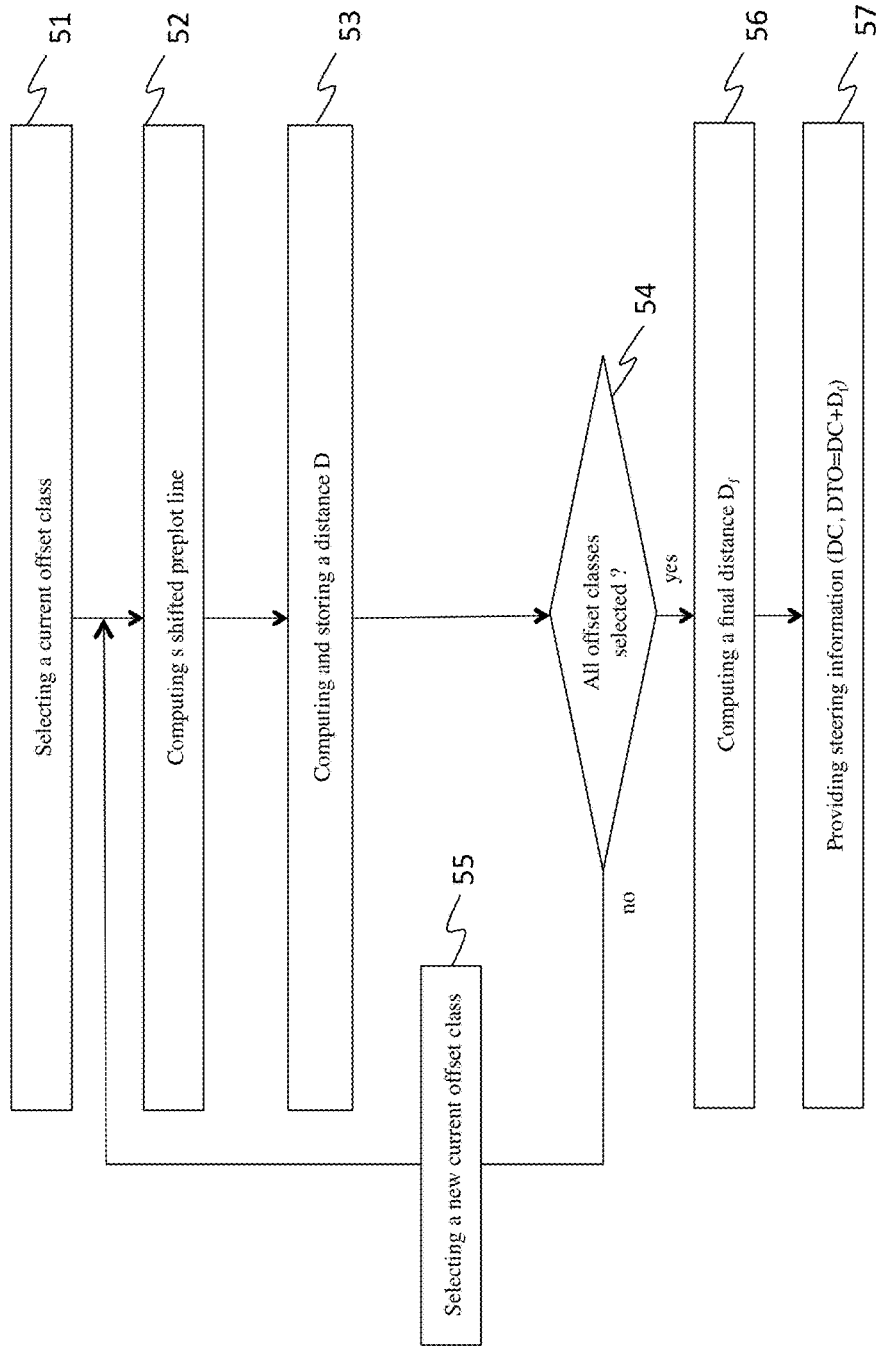
FIG. 5 is a flowchart of a particular embodiment of the method according to the disclosure.

Referring now to FIG. 5, we present a steering method according to a particular embodiment of the disclosure. This method is carried out by a device (for more details about this device, see below description of FIG. 3).

Figure 1:
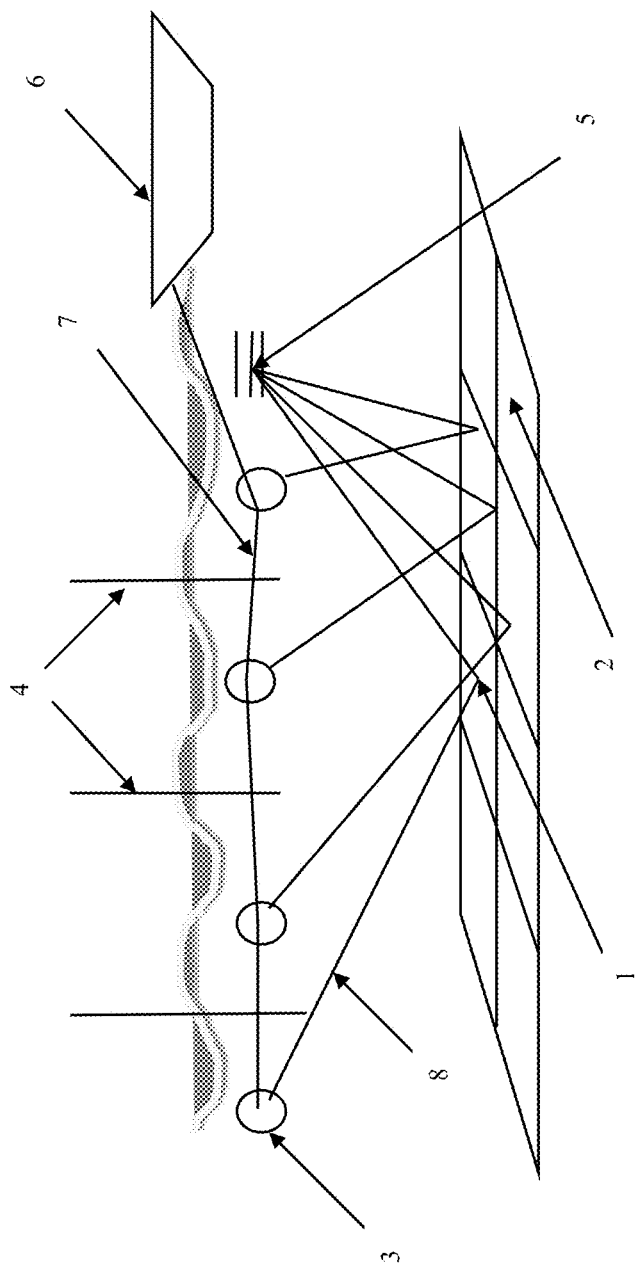
Figure 2:
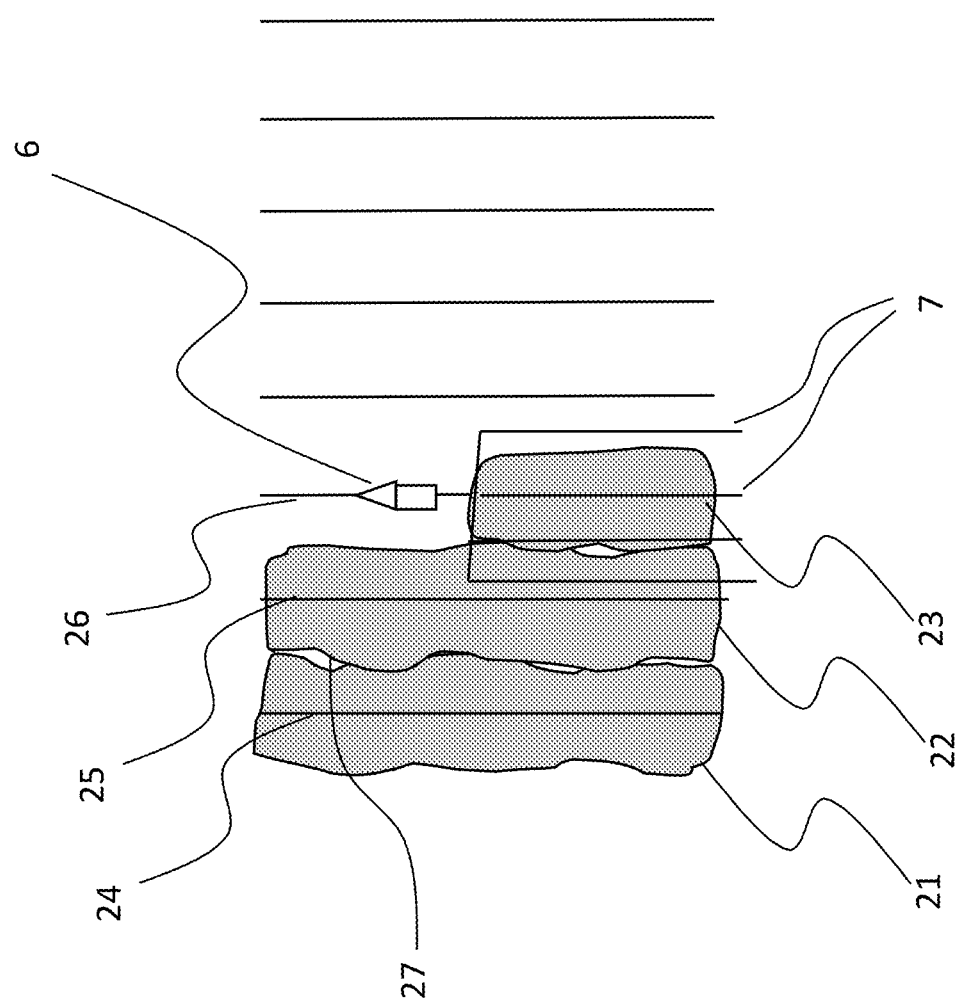

As already discussed in relation to FIG. 1, we consider a seismic vessel associated with a sail line and a preplot line (which are often the same). This seismic vessel tows one or several streamers (acoustic linear antennas) comprising receivers. These receivers receive signals generated by at least one source and reflected by the subsurface's layers, at reflexion points.

We assume that the receivers are divided in a plurality of offset classes (e.g. "near offsets", "near-mid offsets", "mid-far offsets", "mid offsets" and "far offsets").

The input of the steering method are: the positions $(x_i, y_i)$ of the reflexion points (which can be possibly extrapolated, i.e. computed anticipatively by extrapolation), the preplot line, and the sail line.

The outputs of the steering method are steering information to alter the course of the vessel.

In step 51, the device selects as current offset class one of the offset classes. Then for the current offset class, the device carries out steps 52 and 53.

In step 52, the device computes a shifted preplot line which has a shape substantially identical to the shape of the preplot line and which is, according to a regression method, the best fit line associated with n reflexion points associated with the current offset class. In other words, a shifted preplot line is computed in such a way that an arbitrary function taking in parameters the preplot line and the reflexion point coordinates, is minimized.

The regression method is for example a linear regression method (e.g. the least squares regression method), minimizing a function having as argument a set of distances from the set of n reflexion points to the shifted preplot line. In other words, in step 52 the function used is for example the sum of the square distances from the reflexion points to the shifted preplot line, and is possibly minimized using a classical least square.

We present now a particular implementation, in which the preplot line is a straight line and the function mentioned above is the sum of the square distances.

The preplot line's equation is determined in one of the following forms:

$$y = ax + b \quad (1)$$

$$x = b \quad (2)$$

In case (1), the parameters a and b are trivially found (a line passing by two points). The shifted preplot line's equation is: $y = ax + b'$ (a is known, b' is the unique unknown). The error $e_i$ (i.e. the distance from a given reflexion points $P_i(x_i, y_i)$ to the shifted preplot line) is defined as: $e_i = y_i - ax_i - b'$. The purpose is to minimize:

$$J = e^T e = \Sigma_{i=1}^{n} (y_i - ax_i - b')^2$$

Then b' is obtained as follows, with n the number of reflexion points:

$$\frac{\partial J}{\partial b'} = 2 \sum_{i=1}^{n} (-y_i + ax_i + b') = 0 \Rightarrow b' = \frac{1}{n} \sum_{i=1}^{n} (y_i - ax_i)$$

In case (2), the shifted preplot line's equation is: $x = b'$. The error $e_i$ (i.e. the distance from a given reflexion points $P_i(x_i, y_i)$ to the shifted preplot line is defined as: $e_i = x_i - b'$. The purpose is to minimize:

$$J = e^T e = \Sigma_{i=1}^{n} (x_i - b')^2$$

Then b' is obtained as follows, with n the number of reflexion points:

$$\frac{\partial J}{\partial b'} = 2 \sum_{i=1}^{n} (x_i - b') = 0 \Rightarrow b' = \frac{1}{n} \sum_{i=1}^{n} (x_i)$$

In step 53, the device computes and stores a distance D between the preplot line and the shifted preplot line. The distance D is a directed distance from the shifted preplot line to the preplot line, having a negative value when the shifted preplot line is on the right of the preplot line when considering the direction of the preplot line.

In above case (1), the distance D is computed as follows:

$$D = \frac{b - b'}{\sqrt{a^2 + 1}}$$

In above case (2), the distance D is computed as follows: $D = b - b'$

Steps 54 and 55 allow to repeat the process of steps 52 and 53 for each offset class. In step 54, the device checks whether all the offset classes have already been selected. If all the offset classes have already been selected, the process goes to step 56. Otherwise, it goes to step 55, in which the device selects as new current offset class one of the offset classes not yet selected.

In step 56, the device computes a final distance $D_f$ on the basis of the distances D computed for the different offset classes. $D_f$ is for example a weighted average of these distances D (i.e. a weighted average over the offset classes).

In step 57, the device provides steering information comprising, or based on, the final distance $D_f$ to a navigation system or to an operator of a navigation system, to alter the course of the seismic vessel. In other words, the vessel is controlled (either automatically or by suggestion to an operator) by the steering information.

In a particular embodiment, the steering information comprise:
- a directed distance DC from the sail line to a current position of the seismic vessel, having a positive value when the seismic vessel is on the right of the sail line, when considering the direction of the sail line; and
- a desired track offset DTO, which is a directed distance from the sail line to a desired position of the seismic vessel, having a positive value when the seismic vessel is on the right of the sail line when considering the direction of the sail line, DTO being defined as follows: $DTO=DC+D_f$.

If the reflexion points considered are the CMPs ("common mean points"), it is equivalent to work on receiver's coordinates (instead of reflexion point's coordinate, as described above).

Figure 3:
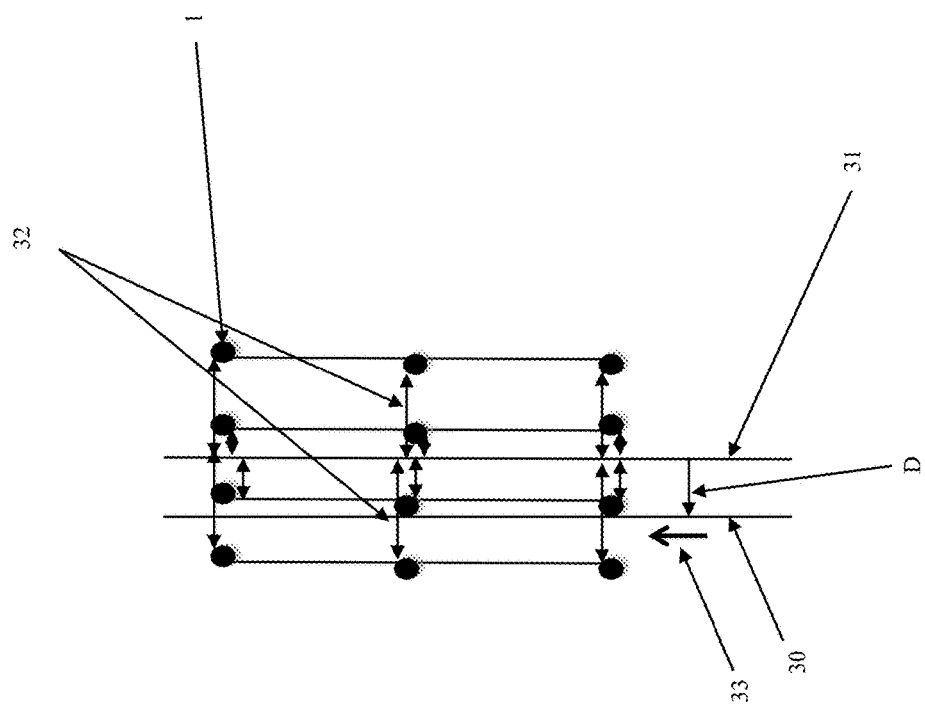
FIG. 3 illustrates the idea of the proposed solution.

FIG. 3 illustrates the idea of the proposed solution.

The preplot line and the shifted preplot line are referenced 30 and 31 respectively. The reflexion points are represented as black discs and referenced 1.

The distance D (directed distance from the shifted preplot line 31 to the preplot line 30) is shown. In this example, D has a negative value, considering the above sign convention (D has a negative value when the shifted preplot line is on the right of the preplot line when considering the direction (see arrow referenced 33) of the preplot line).

The distances from the reflexion points 1 to the shifted preplot line 31 (i.e. the aforesaid errors $e_i$ which are minimized) are represented by double arrows referenced 32.

Figure 6B:
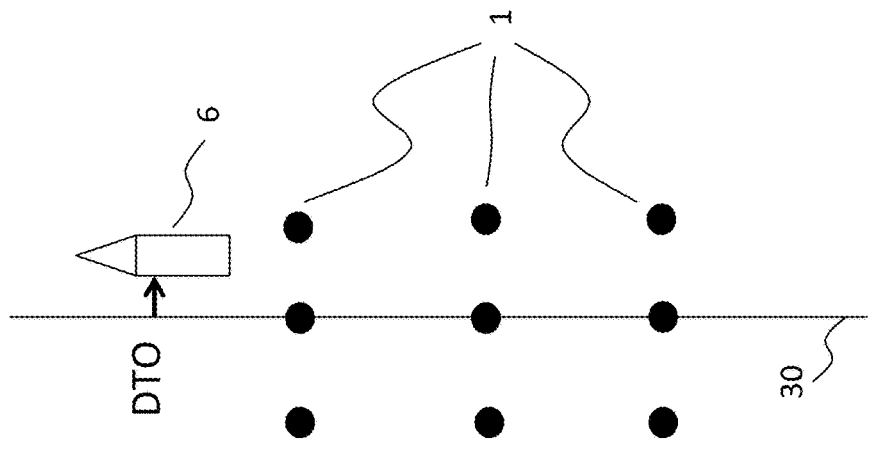
FIGS. 6A and 6B show a vessel before (FIG. 6A) and after (FIG. 6B) modification of the course of the vessel, according to the proposed solution.
Figure 6A:
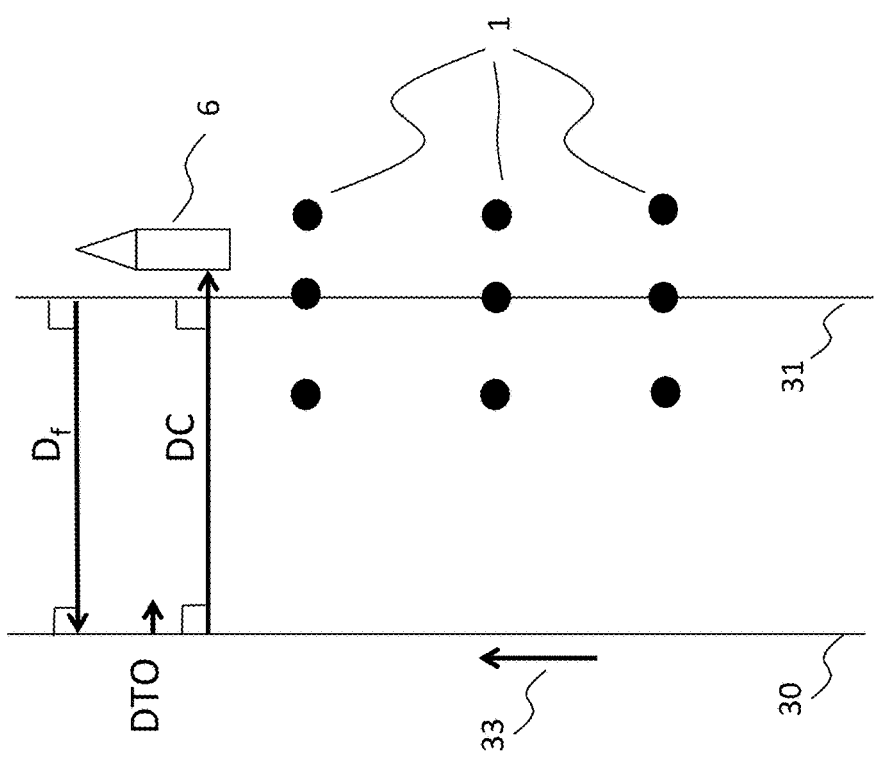

FIGS. 6A and 6B show a vessel before (FIG. 6A) and after (FIG. 6B) modification of the course of the vessel 6, according to the proposed solution.

The preplot line and the shifted preplot line are referenced 30 and 31 respectively. The reflexion points are represented as black discs and referenced 1.

In FIG. 6A (i.e. before modification of the course of the vessel 6), the following distances are shown:
- the final distance $D_f$ (directed distance from the shifted preplot line 31 to the preplot line 30) is shown. In this example, $D_f$ has a negative value, considering the above sign convention ($D_f$ has a negative value when the shifted preplot line is on the right of the preplot line when considering the direction (see arrow referenced 33) of the preplot line);
- the distance DC is shown (directed distance from the sail line to a current position of the seismic vessel 6). In this example we assume that the preplot line and the sail line are the same. In this example, the distance DC has a positive value, considering the above sign convention (DC has a positive value when the seismic vessel is on the right of the sail line, when considering the direction (see arrow referenced 33) of the sail line); and
- the desired track offset DTO (directed distance from the sail line to a desired position of the seismic vessel 6). In this example, DTO has a positive value, considering the above sign convention (DTO has a positive value when the seismic vessel is on the right of the sail line when considering the direction (see arrow referenced 33) of the sail line. DTO is defined as follows: $DTO=DC+D_f$.

In FIG. 6B, i.e. after modification of the course of the vessel 6, we can see that the vessel 6 has reached the desired position: the distance from the sail line to the current position of the seismic vessel 6 is equal to DTO. In other words, we have DTO=DC, and compared to FIG. 6A, the vessel has moved (of the distance $D_f$) towards the preplot line 30. Thus, the reflexion points 1 are spread around the preplot line 30.

Figure 4:
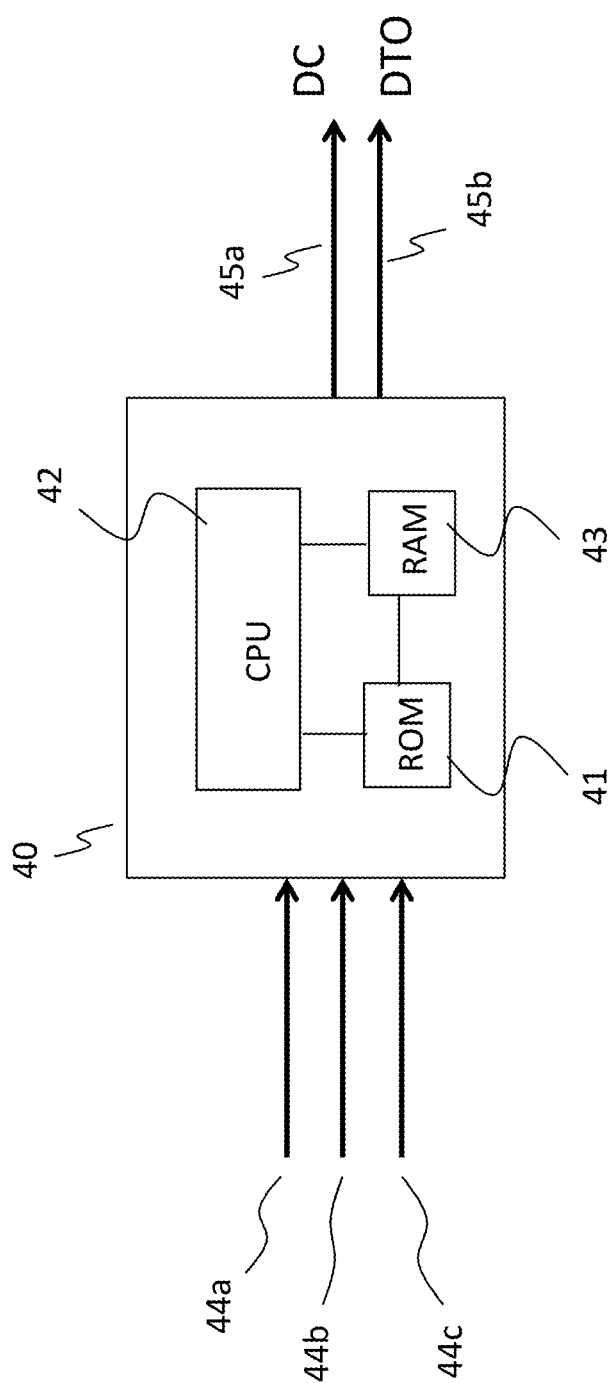
FIG. 4 shows the simplified structure of a device according to a particular embodiment of the disclosure.

FIG. 4 shows the simplified structure of a device (machine) according to a particular embodiment of the disclosure, which carries out the method shown in FIG. 5 for example. This device is comprised for example in the vessel (e.g. in the integrated navigation system INS).

The device 40 comprises a non-volatile memory 41 (e.g. a read-only memory (ROM) or a hard disk), a volatile memory 43 (e.g. a random access memory or RAM) and a processor 42. The non-volatile memory 41 is a non-transitory computer-readable carrier medium. It stores executable program code instructions, which are executed by the processor 42 in order to enable implementation of the method described above with FIG. 5.

Upon initialization, the aforementioned program code instructions are transferred from the non-volatile memory 41 to the volatile memory 43 so as to be executed by the processor 42. The volatile memory 43 likewise includes registers for storing the variables and parameters required for this execution.

The device receives as inputs the positions of the reflexion points 44a, the preplot line 44b, and the sail line 44c. It generates as output steering information, e.g. the desired track offset (DTO) 45a and the distance DC 45b described above.

All the steps of the above steering method can be implemented equally well:
- by the execution of a set of program code instructions executed by a reprogrammable computing machine such as a PC type apparatus, a DSP (digital signal processor) or a microcontroller. This program code instructions can be stored in a non-transitory computer-readable carrier medium that is detachable (for example a floppy disk, a CD-ROM or a DVD-ROM) or non-detachable; or
- by a dedicated machine or component, such as an FPGA (Field Programmable Gate Array), an ASIC (Application-Specific Integrated Circuit) or any dedicated hardware component.

In other words, the disclosure is not limited to a purely software-based implementation, in the form of computer program instructions, but that it can also be implemented in hardware form or any form combining a hardware portion and a software portion.

At least one embodiment of the disclosure provides a steering technique applicable to a seismic vessel, enabling to perform a reasonably good global coverage without compromising a future 4D survey.

At least one embodiment of the disclosure provides a technique of this kind enabling to obtain steering information (e.g. a steering offset (DTO)) automatically, without intervention of a human operator (navigator).

At least one embodiment of the disclosure provides a technique of this kind that is simple to implement and inexpensive.

Although the present disclosure has been described with reference to one or more examples, workers skilled in the art will recognize that changes may be made in form and detail without departing from the scope of the disclosure and/or the appended claims.

The invention claimed is:

1. A method for steering a seismic vessel associated with a sail line and a preplot line, said seismic vessel towing at least one acoustic linear antenna comprising receivers, said receivers receiving signals generated by at least one source and reflected by subsurface's layers at a first set of reflexion points, comprising: a) computing, according to a regression method, a shifted preplot line which has a shape substantially identical to the shape of the preplot line and which is the best fit line associated with at least some reflexion points of the first set of reflexion points; b) computing a distance D between the preplot line and the shifted preplot line; and c) providing steering information comprising or based on the distance D to a navigation system or to an operator of a navigation system, to alter the course of the seismic vessel to make the vessel be in a position wherein, said receivers receiving, in said position of the seismic vessel, signals generated by said at least one source and reflected by subsurface's layers at a second set of reflexion points, said second set of the reflexion points are spread around the preplot line.

2. The method according to claim 1, wherein the regression method is a linear regression method, minimizing a function having as argument a set of distances from a set of n reflexion points to the shifted preplot line.

3. The method according to claim 2, wherein the linear regression method is the least squares regression method.

4. The method according to claim 3, wherein in step a): the preplot line's equation is: y=ax+b; the shifted preplot line's equation is: y=ax+b'; the distance from a given reflexion points P, (x, y,) to the shifted preplot line is defined as: $e_i = y_i - ax_i - b'$; and b' is obtained as follows:

$$b' = \frac{1}{n}\sum_{i=1}^{n}(y_i - ax_i),$$

with n the number of reflexion points; and wherein in step b), the distance D is computed as follows:

$$D = \frac{b - b'}{\sqrt{a^2 + 1}}.$$

5. The method according to claim 3, wherein in step a): the preplot line's equation is: x=b; the shifted preplot line's equation is: x=b'; the distance from a given reflexion points P, (x, y,) to the shifted preplot line is defined as: $e_i = x_i - b'$; and b' is obtained as follows:

$$b' = \frac{1}{n}\sum_{i=1}^{n}x_i,$$

with n the number of reflexion points; and wherein in step b), the distance D is computed as follows: D=b−b'.

6. The method according to claim 1, wherein the distance D is a directed distance from the shifted preplot line to the preplot line, having a negative value when the shifted preplot line is on the right of the preplot line when considering the direction of the preplot line.

7. The method according to claim 6, wherein the steering information comprise: a directed distance DC from the sail line to a current position of the seismic vessel, having a positive value when the seismic vessel is on the right of the sail line, when considering the direction of the sail line; and a desired track offset DTO, which is a directed distance from the sail line to a desired position of the seismic vessel, having a positive value when the seismic vessel is on the right of the sail line when considering the direction of the sail line, DTO being defined as follows: DTO=DC+D.

8. The method according to claim 1, wherein the receivers are divided in a plurality of offset classes, wherein said steps a) and b) are carried out for at least two offset classes of said plurality, a distance D being computed for each offset class, wherein the method comprises a step b') of computing a final distance $D_f$ on the basis of the distances D computed for said at least two offset classes, and wherein in said step c) the steering information comprise or are based on the final distance $D_f$.

9. The method according to claim 8, wherein the final distance $D_f$ is a weighted average of the distances D computed for the at least two offset classes.

10. A non-transitory computer-readable carrier medium storing a computer program comprising program code instructions which, when executed on a computer or a processor, allow to implement a method for steering a seismic vessel associated with a sail line and a preplot line, said seismic vessel towing at least one acoustic linear antenna comprising receivers, said receivers receiving signals generated by at least one source and reflected by subsurface's layers at a first set of reflexion points, said method comprising: a) computing, according to a regression method, a shifted preplot line which has a shape substantially identical to the shape of the preplot line and which is the best fit line associated with at least some reflexion points of the first set of reflexion points; b) computing a distance D between the preplot line and the shifted preplot line; and c) providing steering information comprising or based on the distance D to a navigation system or to an operator of a navigation system, to alter the course of the seismic vessel to make the vessel be in a position wherein, said receivers receiving, in said position of the seismic vessel, signals generated by said at least one source and reflected by subsurface's layers at a second set of reflexion points, said second set of the reflexion points are spread around the preplot line.

11. A device for steering a seismic vessel associated with a sail line and a preplot line, said seismic vessel towing at least one acoustic linear antenna comprising receivers, said receivers receiving signals generated by at least one source and reflected by subsurface's layers at a first set of reflexion points, said device being configured to: compute, according to a regression method, a shifted preplot line which has a shape substantially identical to the shape of the preplot line and which is the best fit line associated with at least some reflexion points of the first set of reflexion points; compute a distance D between the preplot line and the shifted preplot line; and provide steering information comprising or based on the distance D to a navigation system or to an operator of a navigation system, to alter the course of the seismic vessel to make the vessel be in a position wherein, said receivers receiving, in said position of the seismic vessel, signals generated by said at least one source and reflected by subsurface's layers at a second set of reflexion points, said second set of the reflexion points are spread around the preplot line.

\* \* \* \* \*